(12) United States Patent
Wang

(10) Patent No.: US 6,763,962 B1
(45) Date of Patent: Jul. 20, 2004

(54) CONTAINER WITH DOUBLE LAYERS MADE OF DIFFERENT MATERIALS

(75) Inventor: Chih Hung Wang, Tainan Hsien (TW)

(73) Assignee: Duo Yeu Metal Co., Ltd., Tainan Hsien (TW)

( * ) Notice: Subject to any disclaimer, the term of this patent is extended or adjusted under 35 U.S.C. 154(b) by 0 days.

(21) Appl. No.: 10/425,944

(22) Filed: Apr. 30, 2003

(51) Int. Cl.⁷ .................................................. B65D 1/40
(52) U.S. Cl. ............................... 220/62.12; 220/62.14; 220/62.22; 220/663
(58) Field of Search .................. 220/62.13, 62.12, 220/62.22, 675, 674, 676

(56) References Cited

U.S. PATENT DOCUMENTS

| | | | | |
|---|---|---|---|---|
| 1,715,156 A | * | 5/1929 | Witchger | |
| 2,236,904 A | * | 4/1941 | Hendrickson | |
| 2,533,578 A | * | 12/1950 | Gomersall | 220/663 |
| 3,217,923 A | * | 11/1965 | Price | 220/663 |
| 3,248,946 A | * | 5/1966 | Lichtenberg et al. | 73/334 |
| 4,363,240 A | * | 12/1982 | Mizusaki | 73/334 |
| 5,275,277 A | * | 1/1994 | Gallegos | 206/217 |
| 3,241,369 A1 | * | 6/2001 | Wyzenbeek | 220/663 |
| 6,341,712 B1 | * | 1/2002 | Huang | |
| 6,349,841 B1 | * | 2/2002 | Basara | |

* cited by examiner

Primary Examiner—Joseph Man-Fu Moy
(74) Attorney, Agent, or Firm—Rosenberg, Klein & Lee

(57) ABSTRACT

A container with double layers includes a metallic outer layer having through holes on a surrounding portion, and a plastic inner layer formed directly over an inner side of the outer layer by means of injection molding with a mold; the mold is shaped such that three-dimensional projecting portions are formed over corresponding ones of the through holes of the outer layer to project the outer layer in the injection molding, and that the edges of the three-dimensional projecting portions cover those portions of the outer layer that define the through holes; thus, the layers can't easily separate from, or move relative to, each other.

2 Claims, 6 Drawing Sheets

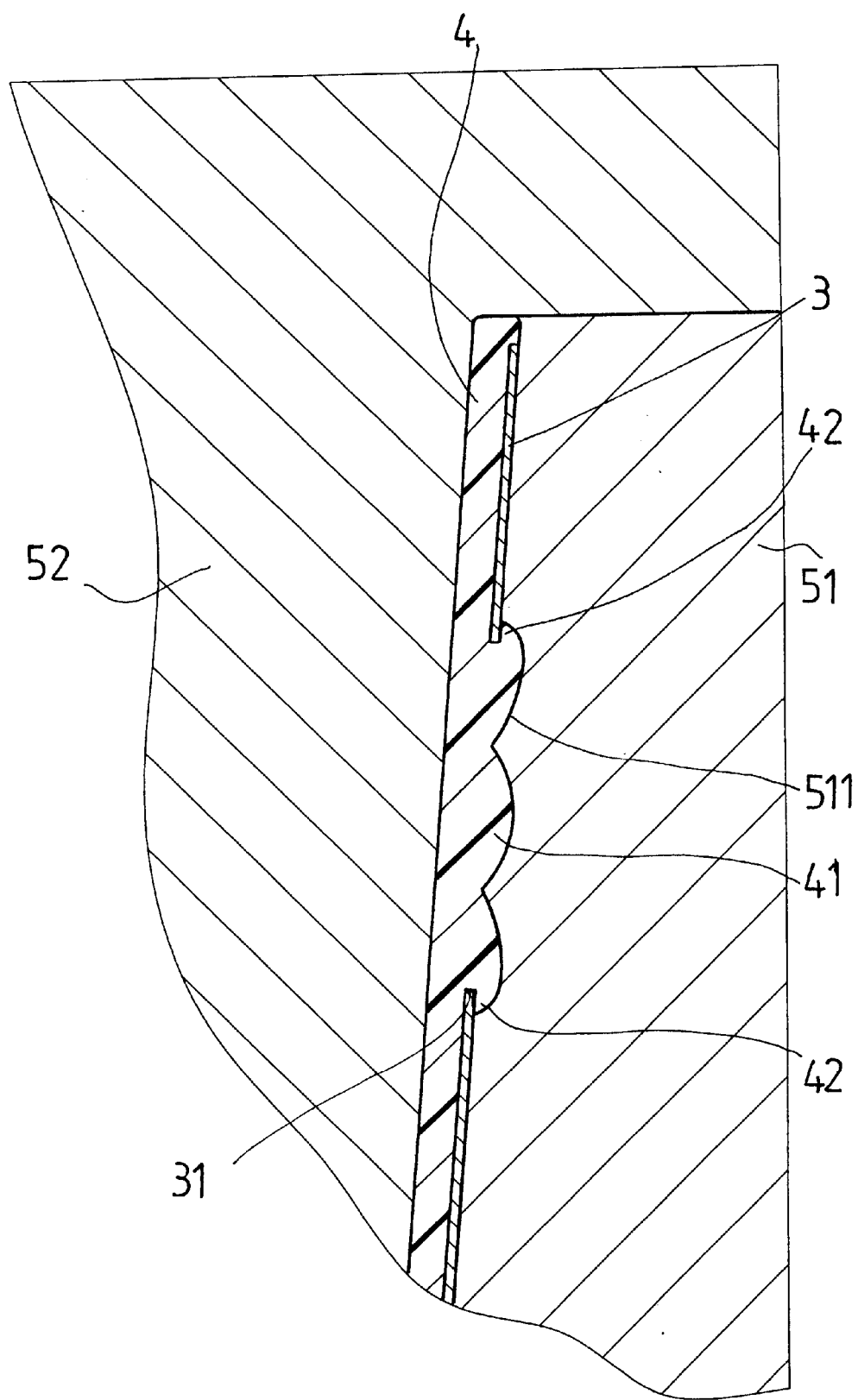
F I G. 3

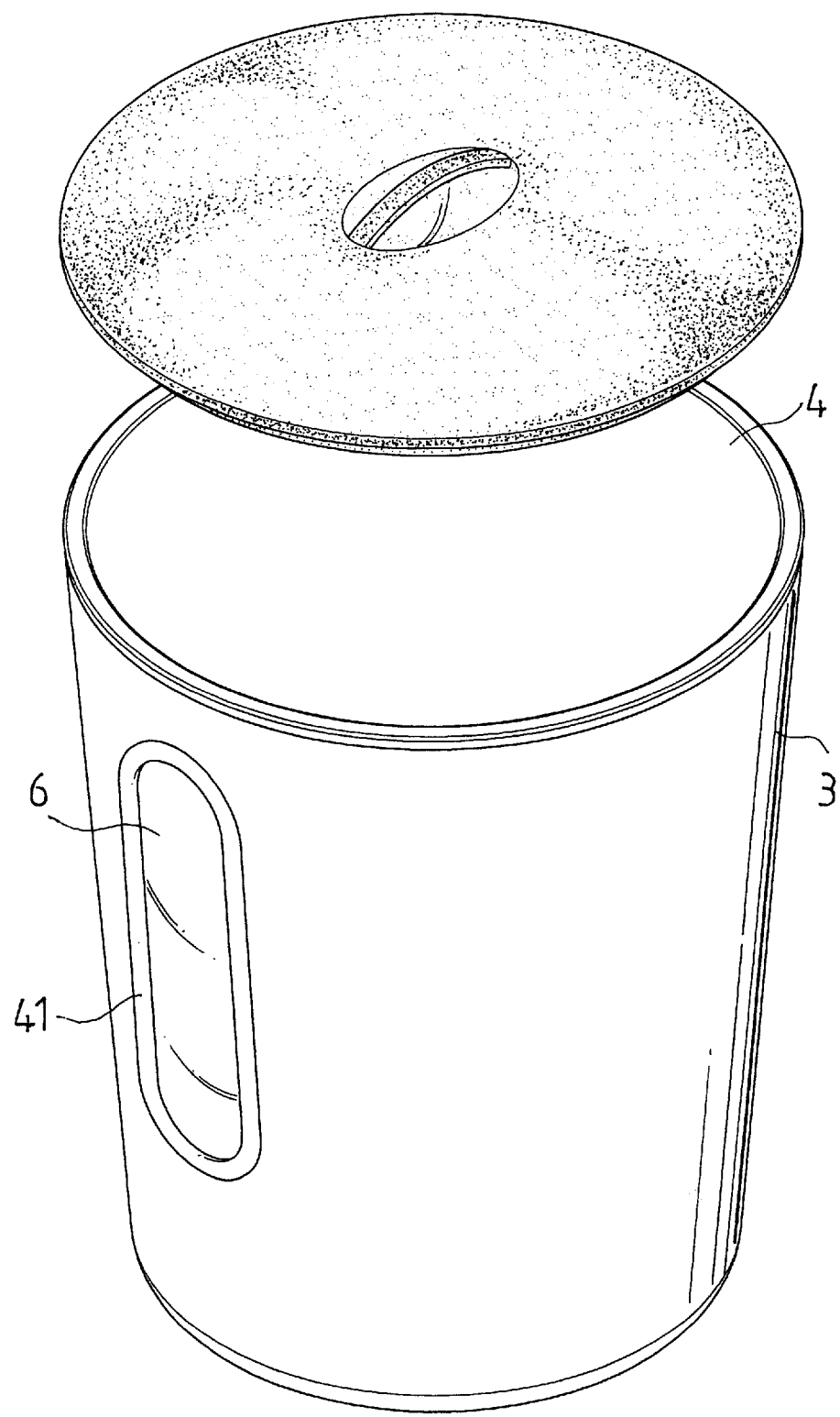
F I G. 4

CONTAINER WITH DOUBLE LAYERS MADE OF DIFFERENT MATERIALS

BACKGROUND OF THE INVENTION

1. Field of the Invention

The present invention relates to a container with double layers made of different materials, more particularly one, which is made in such a way that both of the layers can't separate from each other, move relatively to each other or change shape due to significant change of temperature or hit of other objects.

2. Brief Description of the Prior Art

Containers usually have patterns printed or attached on the surface to be attractive. However, patterns on the surface of a container are likely to be damaged or fade if hard objects are rubbed against them or if they are subject to moisture, or after the container has been used for a long period of time.

Referring to FIG. 5, a conventional container 10 is comprised of outer and inner layers 11, and 12; the outer layer 11 is formed with ornamental through holes 111 with various shapes on the annular portion; the inner layer 12 is disposed in the outer layer 11 so that patterns can be presented by means of the ornamental through holes 111 and the inner layer 12; the inner layer 12 can be merely closely fitted to the outer layer 11 without use of adhesive or securely joined to the outer layer 11 with adhesive. This container 10 is found to have disadvantages as followings:

1. Adhesive used between the layers 11, 12 is likely to become loose, causing the layers 11, 12 to easily separate from each other if the layers are made of different materials to have different coefficients of expansion, and there is significant change of temperature.
2. The layers 11, 12 are prone to move relatively with respect to each other, and even change shape if the inner layer 12 is merely closely fitted into the outer layer 11 without use of adhesive, and other objects hit the container hard.
3. The through holes 111 of the outer layer 11 make the container uneven on the surface. Consequently, the appearance of the container is badly affected.

Referring to FIG. 6, another conventional container 20 is comprised of outer and inner layers 21, and 22 made of different materials; the outer layer 21 is formed with an injection gate 212 on the bottom, and ornamental through holes 211 with various shapes on the annular portion; the inner layer 22 is made, and the holes 211 are filled with plastic materials for the outer layer 22 by means of positioning the outer layer 21 on a mold, and injecting the plastic materials into the mold via the gate 212; thus, both the layers 21, 22 are joined together, and plastics formed in the holes 211 are as high as those portions of the outer layer 21 that surround the through holes 211, i.e. the container 20 is smooth on the surface thereof. However, this container 20 still has disadvantages as followings:

1. Because the layers 11, 12 are made of different materials to have different coefficients of expansion, they are prone to separate from each other when there is significant change of temperature.
2. The layers 21, 22 are prone to move relative to each other, and even change shape when other objects hit the container hard.
3. The injection gate 212 on the bottom of the outer layer 21 will make the whole container take on an unpleasant appearance.
4. The patterns are flat, which are presented by the plastics formed in the through holes 211 in the injection molding for the inner layer 22.

SUMMARY OF THE INVENTION

It is a main object of the present invention to provide a container with double layers made of different materials, of which both of the layers can't easily separate from each other, move relatively to each other or change shape.

The container of the invention includes a metallic outer layer formed with through holes, and a plastic inner layer formed directly over an inner side of the outer layer by means of injection molding with a mold; the mold is shaped such that three-dimensional projecting portions are formed over corresponding ones of the through holes of the outer layer and project beyond the outer layer in the injection molding, and that edges of the projecting portions mount on those portions of the outer layer that define the through holes.

BRIEF DESCRIPTION OF THE DRAWINGS

The present invention will be better understood by referring to the accompanying drawings, wherein:

FIG. 3 is an enlarged partial cross-sectional view of the container according to the present invention, FIG. 4 is a perspective view of the container of the second embodiment;

DETAILED DESCRIPTION OF THE PREFERRED EMBODIMENTS

Figure 1:
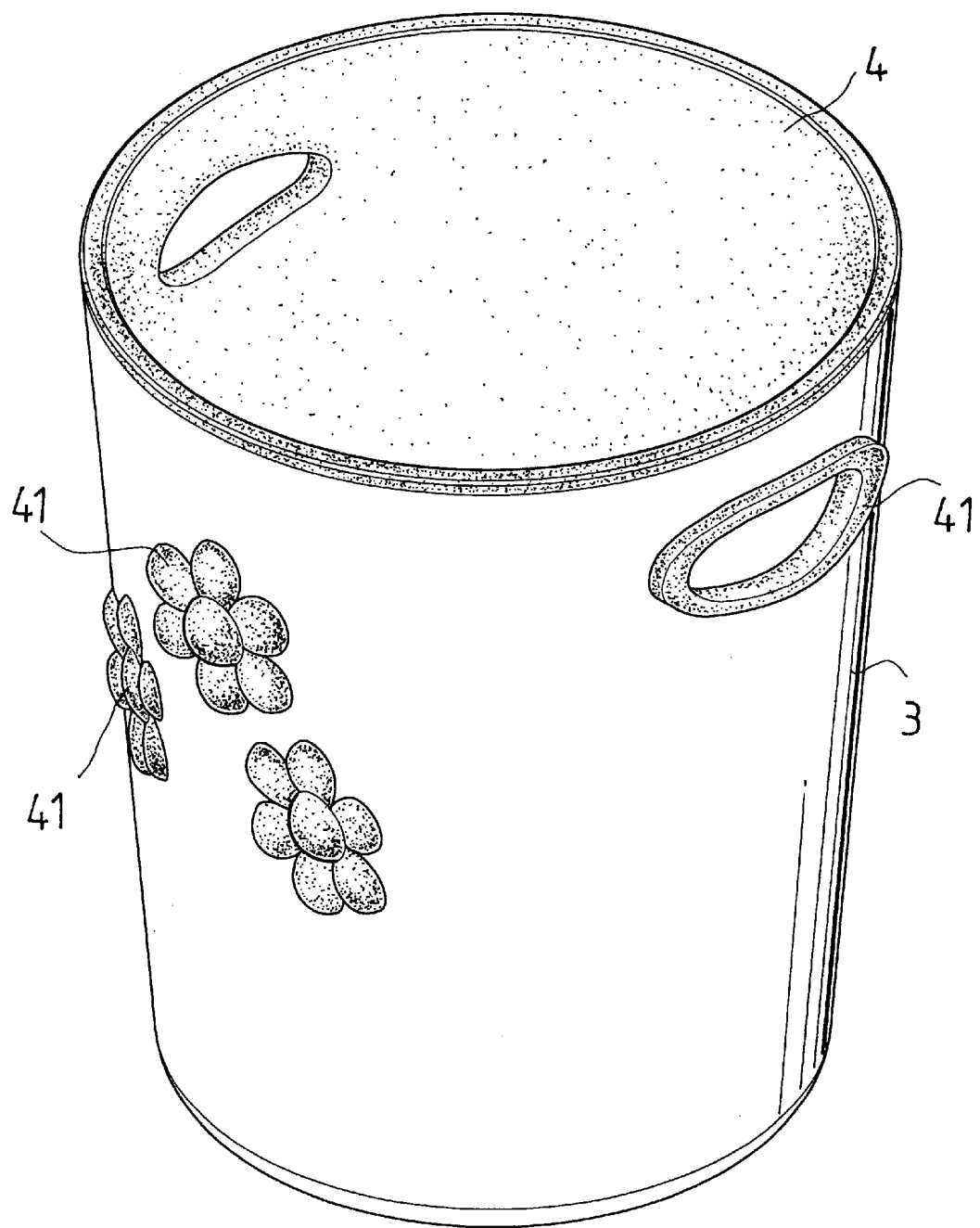
FIG. 1 is a perspective view of the container according to the present invention.
Figure 2:
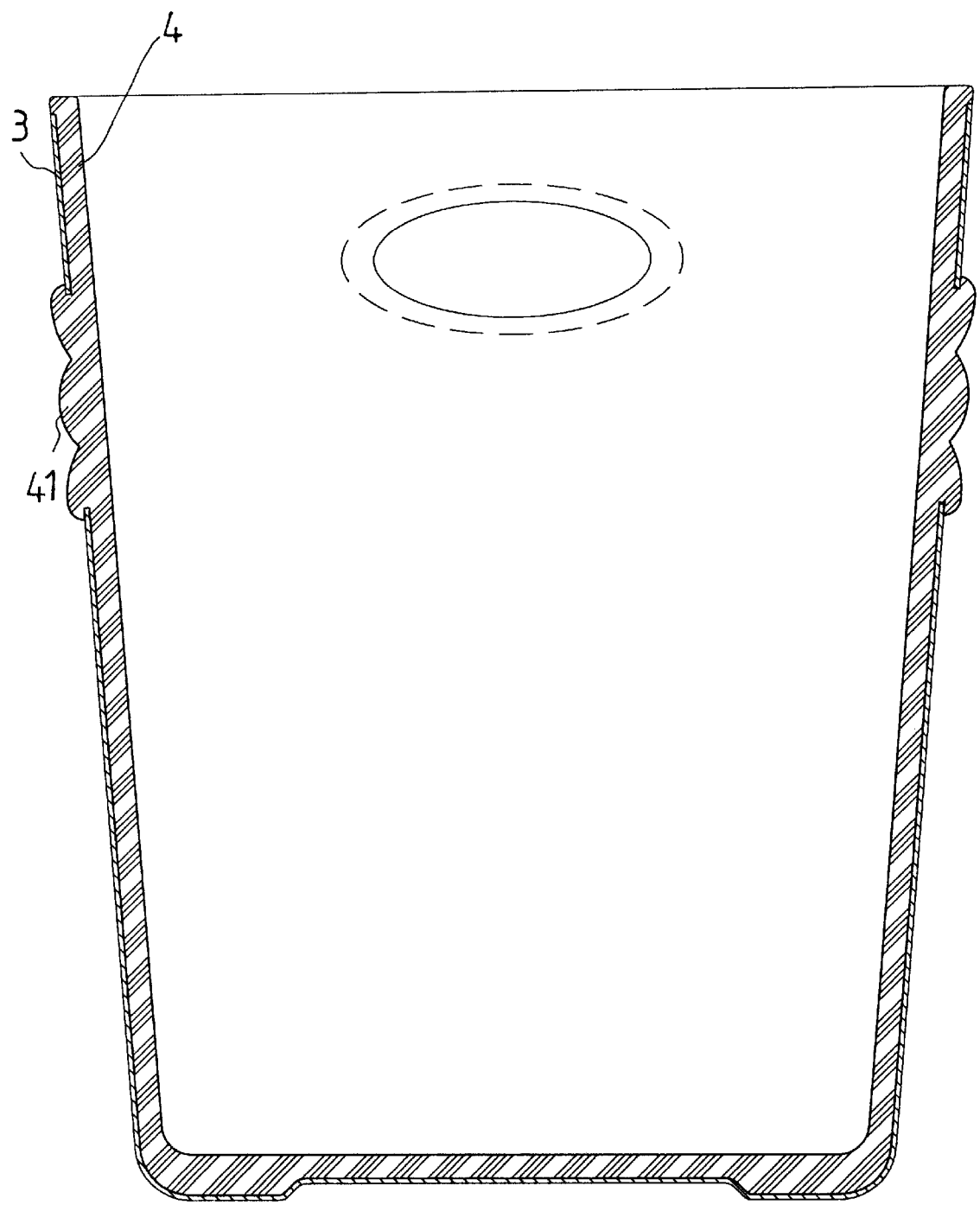
FIG. 2 is a cross-sectional view of the container according to the present invention.
Figure 5:
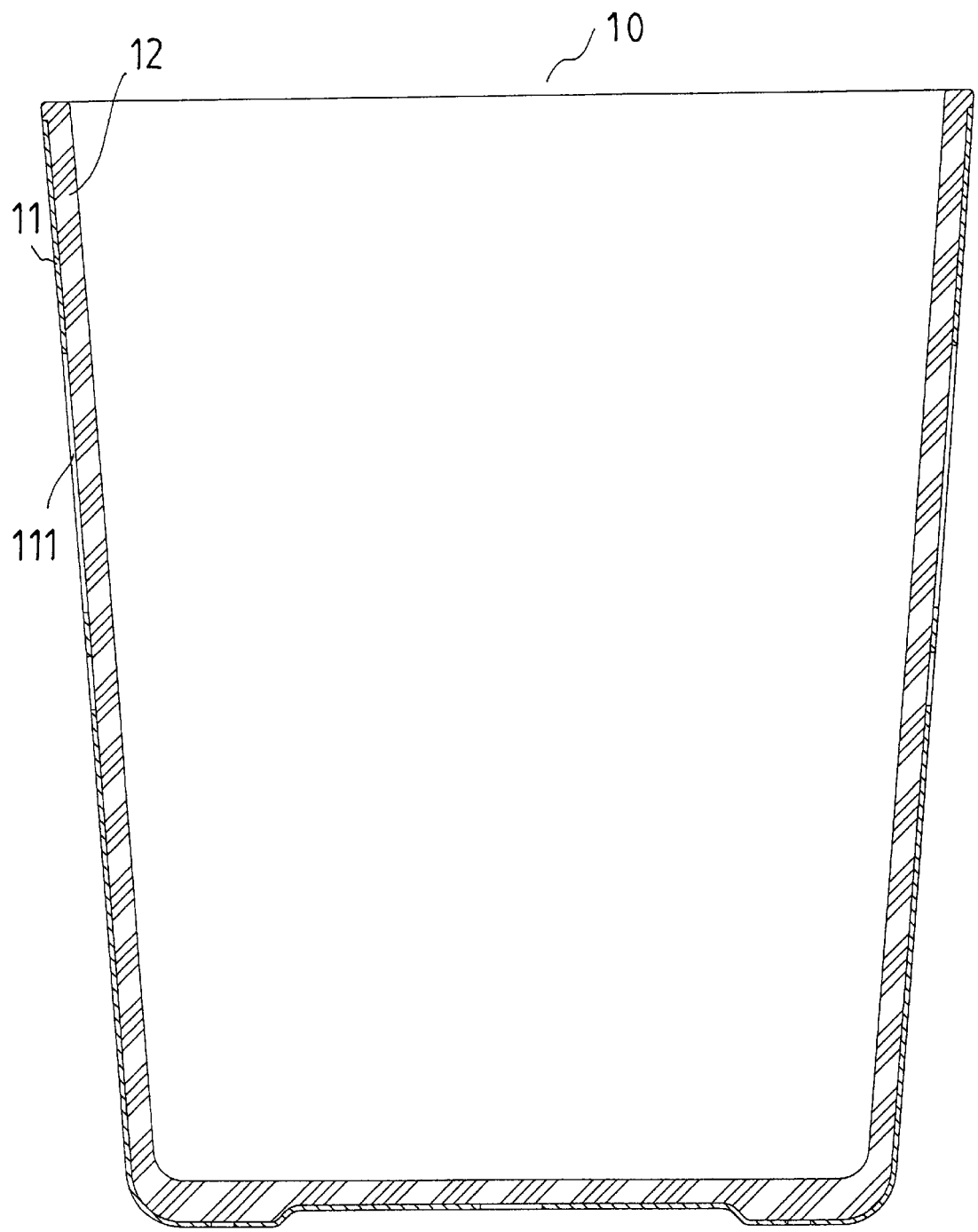
FIG. 5 is a cross-sectional view of the first conventional container as described in the Background.
Figure 6:
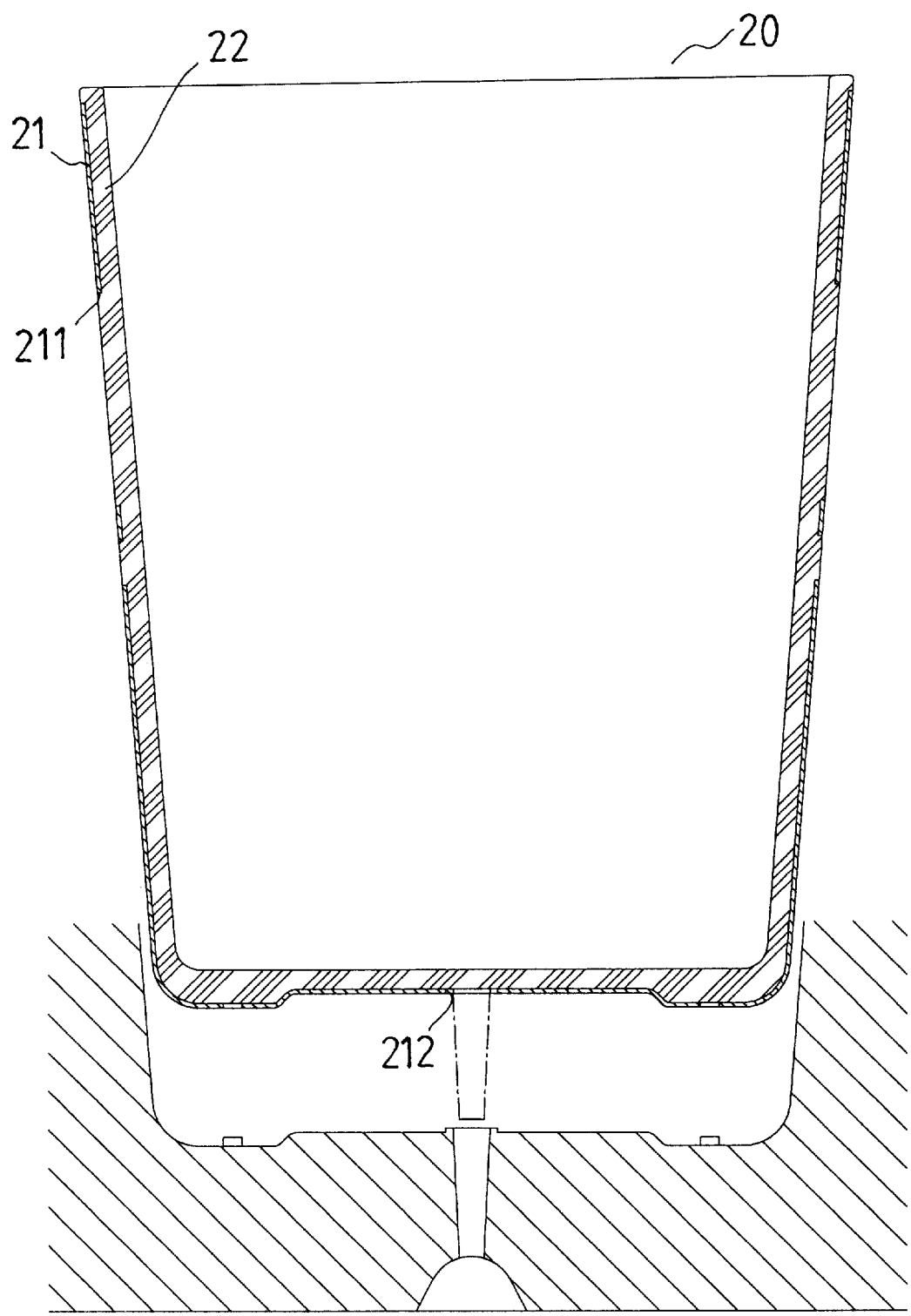
FIG. 6 is a cross-sectional view of the second conventional container.

Referring to FIGS. 1, 2, and 3, a preferred embodiment of a container in the present invention includes a metallic outer layer 3, and a plastic inner layer 4; the outer layer 3 is formed with several ornamental through holes 31 with various shapes on the annular portion thereof.

The inner layer 4 is directly formed over an inner side of the outer layer 3 by means of positioning the outer layer 3 between an inner part 52 of a mold and an outer part 51 of the mold, and injecting plastic materials into the mold via an injection gate (not shown) of the inner mold part 52; the outer mold part 51 has cavities 511, which face corresponding ones of the through holes 31 of the outer layer 3 when the outer layer 3 is positioned in the mold, and which extend over an area at least slightly larger than the corresponding through holes 31, and which are substantially similar to the corresponding through holes 31 in respect of the shape of the edges thereof.

Therefore, after plastic materials are injected into the mold to form of the outer layer 4, the plastic materials will project outwards from the through holes 31 of the outer layer 3, and shaped by means of the cavities 511 of the outer mold part 51. Consequently, the inner layer 4 has three-dimensional projecting portions 41 formed over the through holes 31, and edges 42 of the three-dimensional projecting portions 41 cover those portions of the outer layer 3 that surround the through holes 31. Thus, those portions of the outer layer 3 that surround the through holes 31 are sandwiched between inner portions of the inner layer 4 and the edges 42 of the projecting portions 41 of the inner layer 4, and in turns, the inner layer 4 is securely joined to the outer layer 3.

Referring to FIG. 4, in a second embodiment of the invention, transparent plastic materials are used for the inner layer 4 so that people can see the inside the container through the through holes 31 of the outer layer 3, over and around which transparent objects made of the plastic materials are formed. In addition, the outer layer 3 can be formed with through holes 6 in the shape of windows so that the projecting portions 41 of the inner layer 4 look like windows together with the through holes 6.

From the above description, it can be easily understood that the container of the present invention has advantages as followings:

1. When significant change of temperature occurs to make both of the layers with different coefficients of expansion to change size in different ways, the edges 42 of the projecting portions 41 of the inner layer can still mount the outer side of the outer layer to prevent both layers from separating from each other.
2. For the same reason as above, both of the layers can't move relatively with respect to each other or change shape even if the container is hit hard.
3. Because the projecting portions 41 are three-dimensional and formed over the through holes 31 of the outer layer 3 when the inner layer 4 is being made, the present container is more attractive than the conventional ones.

What is claimed is:

1. An improvement on a container with double layers made of different materials, comprising:
    a metallic outer layer having a plurality of through holes formed through a surrounding portion thereof, each said through hole being defined by a periphery; and,
    a plastic inner layer formed directly on an inner surface of the outer layer by means of injection molding with a mold, and being characterized by:
        three-dimensional projecting portions being formed on said plastic inner layer and projecting through said through holes, each said three-dimensional projecting portion extending beyond a corresponding one of said peripheries in both a radial direction and in a longitudinal direction of said container.
2. The container with double layers made of different materials as claimed in claim 1, wherein the plastic inner layer and the projecting portions are made of a transparent material.

* * * * *